US012550818B2

(12) United States Patent
Wang et al.

(10) Patent No.: US 12,550,818 B2
(45) Date of Patent: Feb. 17, 2026

(54) MOWER

(71) Applicant: TECHTRONIC CORDLESS GP, Anderson, SC (US)

(72) Inventors: Tao Wang, Dongguan (CN); Xiaopeng Sun, Dongguan (CN); Pingshan Chen, Dongguan (CN)

(73) Assignee: TECHTRONIC CORDLESS GP, Anderson, SC (US)

( * ) Notice: Subject to any disclaimer, the term of this patent is extended or adjusted under 35 U.S.C. 154(b) by 649 days.

(21) Appl. No.: 17/966,124

(22) Filed: Oct. 14, 2022

(65) Prior Publication Data

US 2023/0124094 A1    Apr. 20, 2023

(30) Foreign Application Priority Data

Oct. 15, 2021  (CN) .......................... 202122493747.3

(51) Int. Cl.
*A01D 34/74* (2006.01)
*A01D 34/67* (2006.01)
*A01D 101/00* (2006.01)

(52) U.S. Cl.
CPC ............. *A01D 34/74* (2013.01); *A01D 34/67* (2013.01); *A01D 2101/00* (2013.01)

(58) Field of Classification Search
CPC ..... A01D 34/74; A01D 34/67; A01D 2101/00
See application file for complete search history.

(56) References Cited

U.S. PATENT DOCUMENTS

| 3,230,695 | A |   | 1/1966  | West |
| 3,292,351 | A |   | 12/1966 | Larson et al. |
| 3,485,017 | A |   | 12/1969 | Duran et al. |
| 3,841,069 | A |   | 10/1974 | Weck |
| 4,170,151 | A |   | 10/1979 | Olson et al. |
| 4,577,455 | A |   | 3/1986  | Amano et al. |
| 4,905,463 | A | * | 3/1990  | Eilles ............... A01D 34/74 |
|           |   |   |         | 280/43.13 |
| 5,113,642 | A |   | 5/1992  | Dunn |
| 5,381,648 | A |   | 1/1995  | Seegert et al. |

(Continued)

FOREIGN PATENT DOCUMENTS

| AU | 2017100172 A4 | 3/2017 |
| CN | 2865234 Y | 2/2007 |

(Continued)

OTHER PUBLICATIONS

European Search Report Corresponding to U.S. Appl. No. 20/929,732 on Apr. 2, 2024.

*Primary Examiner* — Nicole Coy

(74) *Attorney, Agent, or Firm* — Dority & Manning, P.A.

(57) ABSTRACT

There is provided a mower comprising a base and a height adjustment means. The height adjustment device is a linkage comprised of a front axle, a rear axle and a connecting rod. The base is supported at a position on the front axle offset relative to the front wheel rotation axis, and is supported at a position on the rear axle offset relative to the rear wheel rotation axis. Between the base and the connecting rod is disposed a first elastic member that can apply a first elastic tension so that the base has a rising tendency when being in a low position. Between the base and at least one of the front axle and the rear axle, there is disposed a second elastic member that can apply a second elastic tension.

20 Claims, 3 Drawing Sheets

(56) References Cited

U.S. PATENT DOCUMENTS

| | | | |
|---|---|---|---|
| 5,526,633 A * | 6/1996 | Strong | A01D 34/74 280/43.13 |
| 5,816,035 A | 10/1998 | Schick | |
| 5,906,088 A | 5/1999 | Inui et al. | |
| 5,921,726 A | 7/1999 | Shiozaki et al. | |
| 6,378,280 B1 | 4/2002 | Bone et al. | |
| 6,609,357 B1 | 8/2003 | Davis et al. | |
| 6,634,161 B2 | 10/2003 | Williams | |
| 6,796,111 B2 | 9/2004 | Williams | |
| 7,076,348 B2 | 7/2006 | Bucher et al. | |
| 7,191,583 B2 | 3/2007 | Fukushima et al. | |
| 7,275,355 B2 | 10/2007 | Adams et al. | |
| 7,275,356 B2 | 10/2007 | Roth | |
| 7,412,753 B2 | 8/2008 | Osborne et al. | |
| 7,441,392 B2 | 10/2008 | Lilliestielke et al. | |
| 7,594,377 B1 | 9/2009 | Jansen et al. | |
| 7,610,738 B2 | 11/2009 | Daly et al. | |
| 7,669,395 B2 | 3/2010 | Wehler et al. | |
| 7,716,907 B2 | 5/2010 | Joliff et al. | |
| 7,762,050 B1 | 7/2010 | Kaskawitz | |
| 7,784,254 B2 | 8/2010 | Bever | |
| 7,975,359 B2 | 7/2011 | Osborne et al. | |
| 8,069,639 B2 | 12/2011 | Fancher, III | |
| 8,166,737 B2 * | 5/2012 | Ninomiya | A01D 34/74 56/17.2 |
| 8,297,032 B2 | 10/2012 | Ninomiya et al. | |
| 8,316,510 B2 | 11/2012 | Anraku et al. | |
| 8,429,885 B2 | 4/2013 | Rosa et al. | |
| 8,578,687 B2 | 11/2013 | Ebihara et al. | |
| 8,643,231 B2 | 2/2014 | Flanary | |
| 8,653,786 B2 | 2/2014 | Baetica et al. | |
| 8,713,761 B2 | 5/2014 | Grewe et al. | |
| 8,813,314 B2 | 8/2014 | Osborne et al. | |
| 8,935,907 B2 | 1/2015 | Abe et al. | |
| 8,966,870 B2 | 3/2015 | Mackinnon et al. | |
| 8,984,718 B2 | 3/2015 | Ejdehag et al. | |
| 9,038,356 B2 | 5/2015 | Shao et al. | |
| 9,078,395 B2 | 7/2015 | Johansson et al. | |
| 9,116,860 B2 | 8/2015 | Bennah et al. | |
| 9,122,652 B2 | 9/2015 | Bennah et al. | |
| 9,192,096 B2 | 11/2015 | Harris, III | |
| 9,241,440 B2 | 1/2016 | Roberge | |
| 9,257,925 B2 | 2/2016 | Coates | |
| 9,439,349 B2 | 9/2016 | Drake et al. | |
| 9,439,352 B2 | 9/2016 | Arvidsson | |
| 9,446,705 B2 | 9/2016 | Dwyer | |
| 9,615,507 B2 | 4/2017 | Drew et al. | |
| 9,648,805 B2 | 5/2017 | Nie et al. | |
| 9,679,419 B2 | 6/2017 | Dwyer | |
| 9,743,580 B2 | 8/2017 | Mitchell | |
| 9,783,203 B2 | 10/2017 | Koike et al. | |
| 9,794,652 B2 | 10/2017 | Nohra et al. | |
| 9,936,634 B2 | 4/2018 | Yang et al. | |
| 10,123,478 B2 | 11/2018 | Shaffer | |
| 10,158,302 B2 | 12/2018 | Fukano et al. | |
| 10,299,432 B1 | 5/2019 | Kelly et al. | |
| 10,477,759 B2 | 11/2019 | Matsuda et al. | |
| 10,485,169 B2 | 11/2019 | Yamaoka et al. | |
| 10,524,420 B2 | 1/2020 | Yamaoka et al. | |
| 10,570,869 B2 | 2/2020 | Dwyer | |
| 10,687,464 B2 | 6/2020 | Zeiler et al. | |
| 10,709,061 B2 | 7/2020 | Fukano et al. | |
| 11,889,785 B2 * | 2/2024 | Karsten | A01D 34/68 |
| 2007/0209344 A1 | 9/2007 | Berkeley | |
| 2011/0239611 A1 | 10/2011 | Maruyama et al. | |
| 2012/0085205 A1 | 4/2012 | Quick | |
| 2012/0228041 A1 | 9/2012 | Borinato | |
| 2014/0126952 A1 | 5/2014 | Fay, II | |
| 2015/0239086 A1 | 8/2015 | Lee | |
| 2016/0157424 A1 | 6/2016 | Roth et al. | |
| 2016/0353659 A1 | 12/2016 | Schaedler | |
| 2017/0046663 A1 | 2/2017 | Wong et al. | |
| 2017/0254643 A1 | 9/2017 | Telliard | |
| 2019/0059227 A1 | 2/2019 | Conrad et al. | |
| 2019/0104678 A1 | 4/2019 | Schaedler et al. | |
| 2019/0304211 A1 | 10/2019 | Shimamura et al. | |
| 2019/0320580 A1 | 10/2019 | Haneda et al. | |
| 2019/0380265 A1 | 12/2019 | Matsuda et al. | |
| 2020/0000030 A1 | 1/2020 | Wei et al. | |
| 2020/0113133 A1 | 4/2020 | Zeiler et al. | |
| 2020/0163275 A1 | 5/2020 | Zhao et al. | |
| 2020/0220123 A1 | 7/2020 | Ehrler et al. | |
| 2020/0245555 A1 | 8/2020 | Colber et al. | |
| 2021/0169000 A1 | 6/2021 | Yamagishi et al. | |

FOREIGN PATENT DOCUMENTS

| | | |
|---|---|---|
| CN | 201230476 Y | 5/2009 |
| CN | 201541473 U | 8/2010 |
| CN | 201663811 U | 12/2010 |
| CN | 201667825 U | 12/2010 |
| CN | 202232160 U | 5/2012 |
| CN | 202406535 U | 9/2012 |
| CN | 202738444 U | 2/2013 |
| CN | 104115613 A | 10/2014 |
| CN | 203985048 U | 12/2014 |
| CN | 204259408 U | 4/2015 |
| CN | 204291806 U | 4/2015 |
| CN | 104969713 A | 10/2015 |
| CN | 104982141 A | 10/2015 |
| CN | 103957688 B | 12/2015 |
| CN | 105123084 A | 12/2015 |
| CN | 103843515 B | 2/2016 |
| CN | 205052171 U | 3/2016 |
| CN | 105493731 A | 4/2016 |
| CN | 205546540 U | 9/2016 |
| CN | 205567104 U | 9/2016 |
| CN | 205596610 U | 9/2016 |
| CN | 105993396 A | 10/2016 |
| CN | 205884035 U | 1/2017 |
| CN | 106487286 A | 3/2017 |
| CN | 106576608 A | 4/2017 |
| CN | 106602946 A | 4/2017 |
| CN | 106612969 A | 5/2017 |
| CN | 206136691 U | 5/2017 |
| CN | 106856799 A | 6/2017 |
| CN | 206517326 U | 9/2017 |
| CN | 107593088 A | 1/2018 |
| CN | 206978043 U | 2/2018 |
| CN | 207151195 U | 3/2018 |
| CN | 207185221 U | 4/2018 |
| CN | 207491543 U | 6/2018 |
| CN | 207665484 U | 7/2018 |
| CN | 207783573 U | 8/2018 |
| CN | 109765003 A | 5/2019 |
| CN | 109769453 A | 5/2019 |
| CN | 110122045 A | 8/2019 |
| CN | 209268030 U | 8/2019 |
| CN | 209420341 U | 9/2019 |
| CN | 110915404 A | 3/2020 |
| CN | 210143311 U | 3/2020 |
| CN | 210183903 U | 3/2020 |
| CN | 111165156 A | 5/2020 |
| CN | 210694954 U | 6/2020 |
| DE | 2923272 A1 | 12/1980 |
| DE | 19934636 C2 | 10/2002 |
| DE | 20308046 U1 | 7/2003 |
| DE | 102004020985 A1 | 11/2005 |
| DE | 202004019453 U1 | 4/2006 |
| DE | 202008017250 U1 | 6/2009 |
| DE | 202012102708 U1 | 8/2012 |
| DE | 202013005119 U1 | 6/2013 |
| DE | 102014226742 A1 | 5/2016 |
| DE | 202016105854 U1 | 11/2016 |
| DE | 102017205320 A1 | 10/2018 |
| EP | 0047502 B1 | 2/1985 |
| EP | 0809929 B1 | 3/2002 |
| EP | 1008289 B1 | 4/2005 |
| EP | 1752036 B1 | 7/2008 |
| EP | 1884153 B1 | 3/2010 |
| EP | 2422602 A1 | 2/2012 |
| EP | 2465337 B1 | 9/2013 |
| EP | 2436258 B1 | 5/2014 |
| EP | 2476303 B1 | 11/2015 |

(56) References Cited

FOREIGN PATENT DOCUMENTS

| | | |
|---|---|---|
| EP | 3381260 A1 | 10/2018 |
| EP | 3381261 A1 | 10/2018 |
| EP | 3420793 A1 | 1/2019 |
| EP | 2774470 B1 | 3/2019 |
| EP | 3282827 B1 | 4/2019 |
| EP | 3498073 A1 | 6/2019 |
| EP | 3167703 B1 | 7/2019 |
| EP | 3528213 A1 | 8/2019 |
| EP | 3381259 B1 | 4/2020 |
| GB | 2386813 B | 6/2005 |
| GB | 2420772 C | 3/2008 |
| GB | 2506384 B | 3/2017 |
| JP | 6092005 B2 | 3/2017 |
| JP | 6707009 B2 | 6/2020 |
| WO | WO2004016395 A2 | 2/2004 |
| WO | WO2016108155 A1 | 7/2016 |
| WO | WO2016140236 A1 | 9/2016 |
| WO | WO2018011016 A1 | 1/2018 |

* cited by examiner

MOWER

This application claims the benefit of priority to Chinese Patent Application No. CN 202122493747.3, filed on Oct. 15, 2021, the disclosure of which is incorporated by reference herein in its entirety.

TECHNICAL FIELD

The present disclosure relates to a mower.

BACKGROUND

A mower typically includes a base, a cutting tool mounted under the base, and a moving device. The mower is adapted to move on a lawn with rotation of the moving device and to cut and trim the grass on the lawn as the cutting tool rotates at a high speed. The mower further includes a height adjustment device having the base mounted thereon and configured to adjust the height of the base relative to the moving device to meet different needs of grass cutting height. The height adjustment device typically includes a connecting rod operates to drive the base to move up and down. In order to enable a user to operate it with less effort, there is typically a spring coupled between the base and the connecting rod. When the base is unlocked, the elastic tension applied by the spring can assist in raising the base such that the user can operate the mower more easily.

Nevertheless, the spring is almost kept in a tension state all the time, and stress concentration in the base may occur as a result. After a long-time use, a part of the base may be deformed or even damaged, resulting in a failure at precise mating parts of the base, difficulties in disassembling, or even making the machine unusable.

As such, there is a need for providing a mower which can at least partly solve the above problem while enabling the easy operation.

SUMMARY

The objective of the present disclosure is to provide a mower, so as to solve the problem that the base is easily deformed when subjected to a tension exerted by a spring assisting in raising for a long time.

According to an aspect of the present disclosure, the mower comprises:
  a base configured to receive a cutting tool; and
  a height adjustment device comprising:
  a front axle supporting a front wheel rotatable about a front wheel rotation axis at each end thereof,
  a rear axle supporting a rear wheel rotatable about a rear wheel rotation axis parallel to the front wheel rotation axis at each end thereof, and
  a connecting rod disposed along a longitudinal direction of the mower, a front end thereof being pivotably coupled to the front axle about a first axis offset relative to the front wheel rotation axis, a rear end thereof being pivotably coupled to the rear axle about a second axis offset relative to the rear wheel rotation axis;
  wherein the base is supported at a position on the front axle offset relative to the front wheel rotation axis, and a position on the rear axle offset relative to the rear wheel rotation axis,
  wherein, a first elastic member is disposed between the base and the connecting rod, which can apply a first elastic tension so that the base has a rising tendency when being in a low position, and a second elastic member is disposed between the base and at least one of the front axle and the rear axle, which can apply a second elastic tension, a stress exerted by the second elastic tension on a bottom of the base being opposite to a stress exerted by the first elastic tension to the bottom of the base.

According to the present disclosure, the second elastic member is used to apply a reverse tension to the base, so as to counteract the tension of the first elastic member and thus decrease or avoid stress concentration from being formed in the base, and effectively avoid deformation of the base caused by the stress concentration during long-term use and thus prolong its service life.

In an embodiment, the second elastic member is disposed on the bottom of the base.

With the solution, the second elastic member is disposed at a position where the base is most likely to be deformed, and thereby a better anti-deformation effect can be achieved.

In an embodiment, the second elastic member is arranged at two ends of the front axle and/or two ends of the rear axle.

With the solution, the two ends of the front axle and/or the two ends of the rear axle coupled to the second elastic member are subjected to uniform force, such that tilting can be avoided.

In an embodiment, the second elastic member is disposed at an axial middle part of the front axle and/or the rear axle.

With the solution, only one second elastic member is provided to reduce the number of components and simplify the assembling.

In an embodiment, the second elastic member does not overlap the first elastic member in the longitudinal direction of the mower.

In an embodiment, the second elastic member partially overlaps the first elastic member in the longitudinal direction of the mower.

With the above solutions, the actual position of the second elastic member can be flexibly chosen depending on the specific structures and layouts of the base and the elastic members.

In an embodiment, at least one of the first elastic member and the second elastic member is a spring.

With the solution, the spring used as the elastic member has the advantages of: a good elastic stretch effect and a long service life.

In an embodiment, a horizontal component of the first elastic tension is balanced by a horizontal component of the second elastic tension.

This solution can eliminate stress concentration formed in the base due to arrangement of the elastic member and avoid generation of a new stress.

BRIEF DESCRIPTION OF THE DRAWINGS

For the sake of better understanding on the above and other objectives, features, advantages, and functions of the present disclosure, the preferred embodiments are provided with reference to the drawings. The same reference symbols refer to the same components throughout the drawings. It is to be understood by those skilled in the art that the drawings are merely provided to illustrate preferred embodiments of the present disclosure, without suggesting any limitation to the protection scope of the present disclosure, and respective components therein are not necessarily drawn to scale.

Figure 1:
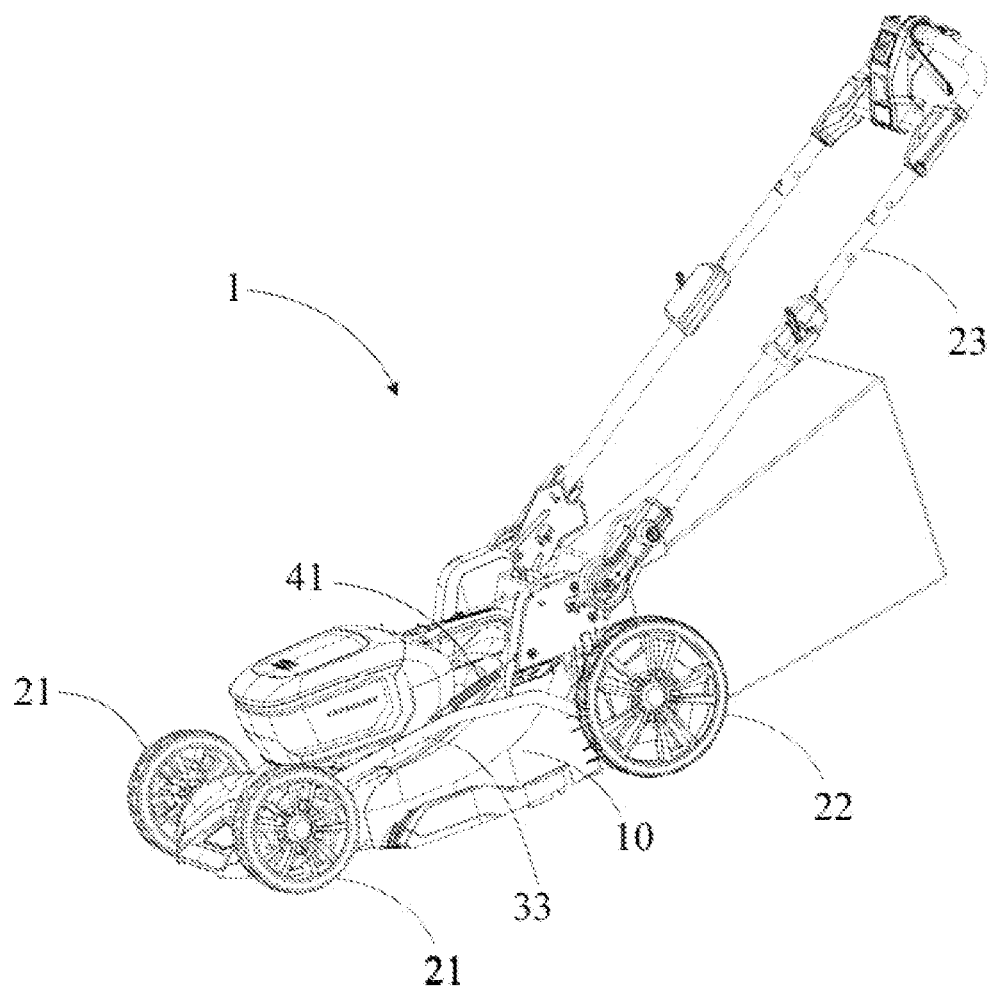
FIG. 1 is a perspective view of a mower according to a preferred embodiment of the present disclosure.

REFERENCE SIGNS 1 mower
10 base
11 round cavity
12 cutting tool
21 front wheel
22 rear wheel
23 handle frame
30 height adjustment device
31 front axle
32 rear axle
33 connecting rod
34 first end plate
35 second end plate
41 first elastic member
42 second elastic member
AX1 front wheel rotation axis
AX2 rear wheel rotation axis
AX3 first axis
AX4 second axis

DETAILED DESCRIPTION OF EMBODIMENTS

Reference now will be made to the drawings to describe in detail embodiments of the present disclosure. What will be described herein will only cover preferred embodiments of the present disclosure, based on which those skilled in the art would envision other possible manners which also fall into the scope described herein.

The present disclosure provides a mower which is arranged to operate on a surface of a lawn or a surface where the grass grows, in order to cut the grass. The act is typically called "mowing a lawn" which is generally performed by a gardener or garden worker to maintain a lawn.

FIG. 1 is a perspective view of a mower 1 according to a preferred embodiment of the present disclosure, including a base 10, a moving device and a handle frame 23. The moving device of the mower 1 includes front wheels 21 and rear wheels 22. The base 10 is substantially disposed between the front wheels 21 and the rear wheels 22. A drive (not shown) mounted on the base 10, and a cutting tool 12 is disposed on the bottom (see FIG. 3) of the base 10. The mower 1 can be moved with the moving device on a work surface (e.g. a lawn), and the cutting tool 12 can simultaneously operate as it is driven by the drive to cut and trim the grass on the lawns. The handle frame 23 can be held by an operator during operation of the mower 1 to enable movement of the moving device in forward-backward direction.

Figure 2:
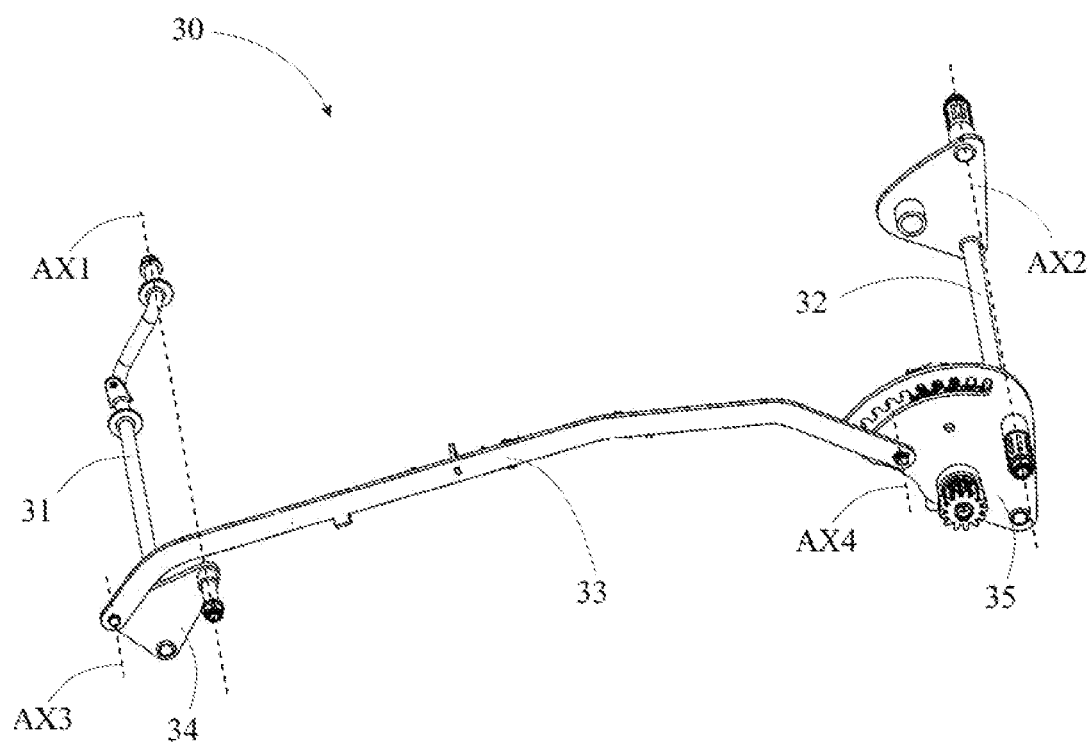
FIG. 2 schematically shows a height adjustment device of the mower as shown in FIG. 1.

The mower 1 further includes a height adjustment device for adjusting the height of the base 10 to meet different needs of grass cutting height. FIG. 2 shows a structure of a height adjustment device 30 including a front axle 31, a rear axle 32 and a connecting rod 33. The front axle 31 and the rear axle 32 are disposed substantially transverse to a movement direction of the mower 1 during operation, where the movement direction may be defined as the longitudinal direction of the mower. The front axle 31 at two ends is installed with a group of front wheels 21, and defines a front wheel rotation axis AX1 of the front wheels 21. The rear axle 32 at two ends is installed with a group of rear wheels 22, and defines a rear wheel rotation axis AX2 of the rear wheels 22. It would be appreciated that the front wheel rotation axis AX1 and the rear wheel rotation axis AX2 are usually substantially parallel to each other.

The connecting rod 33 is disposed substantially along the longitudinal direction of the mower 1, i.e., transverse to the front axle 31 and the rear axle 32. The connecting rod 33 is coupled at the front end to the front axle 31 about a first axis AX3 and coupled at the rear end to the rear axle 32 about a second axis AX4. Wherein, the first axis AX3 and the second axis AX4 are both parallel to the front wheel rotation axis AX1. However, the first axis AX3 is offset relative to the front wheel rotation axis AX1, and the second axis AX4 is offset relative to the rear wheel rotation axis AX2, such that the front axle 31, the rear axle 32 and the connecting rod 33 integrally form a linkage mechanism.

Preferably, the front axle 31 is provided with a first end plate 34, via which the connecting rod 33 at its front end is coupled to the front axle 31 and drives the front axle 31 to rotate about the front wheel rotation axis AX1. That is, the front axle 31 is offset relative to the front wheel rotation axis AX1. The rear axle 32 is provided with a second end plate 35, via which the connecting rod 33 at its rear end is coupled to the rear axle 32 and drives the rear axle 32 to rotate about the rear wheel rotation axis AX2. That is, the rear shaft 32 is offset relative to the rear wheel rotation axis AX2. Further preferably, the front axle 31 and the first end plate 34 are formed as an integral structure, and the rear axle 32 and the second end plate 35 are formed as an integral structure.

The base 10 is mounted on the front axle 31 and the rear axle 32 in a manner that the mounting position of the base 10 is offset not only relative to the front wheel rotation axis AX1 but also relative to the rear wheel rotation axis AX2. It would be appreciated that the front wheel axis AX1 and the rear wheel rotation axis AX2 are fixed relative to the height of the work surface of the mower 1, which is substantially equal to the radius of the front wheel 21 and the rear wheel 22 respectively. When the height of the base 10 needs to be adjusted, the linkage mechanism of the height adjustment device 30 acts, the front axle 31 rotates about the front wheel rotation axis AX1, and the rear axle 32 rotates about the rear wheel rotation axis AX2, such that the height of the mounting position of the base 10 on the front axle 31 relative to the front wheel rotation axis AX1 is changed as desired, and the height of the mounting position of the base 10 on the rear axle 32 relative the rear wheel rotation axis AX2 is changed simultaneously likewise. In this way, the height of the base 10 is adjusted relative to the front wheel 21 and the rear wheel 32. Since the heights from the front wheel 21 and the rear wheel 32 to the work surface are fixed, the height of the base 10 relative to the work surface is adjusted. Moreover, as the front axle 31 and the rear axle 32 are adjusted simultaneously, it can be guaranteed that the height of front portion of the base 10 and the height of rear portion of the base 10 are consistent with each other. The base 10 can then be locked at the desired height by means of a locking device.

With reference to FIG. 1 again, a first elastic member 41 is disposed between the base 10 and the connecting rod 33 of the height adjustment device 30. An example of the first elastic member may be a spring which can apply an elastic tension between the base 10 and the connecting rod 33. In a further embodiment, other suitable elastic member may also be employed. When the base 10 is in a low position, the elastic tension makes the base 10 have a tendency to return to a higher position. In the circumstance, when the base 10 is unlocked, the elastic tension of the first elastic member 41 can assist in raising the base 10, thus allowing a user to operate with less effort.

Figure 3:
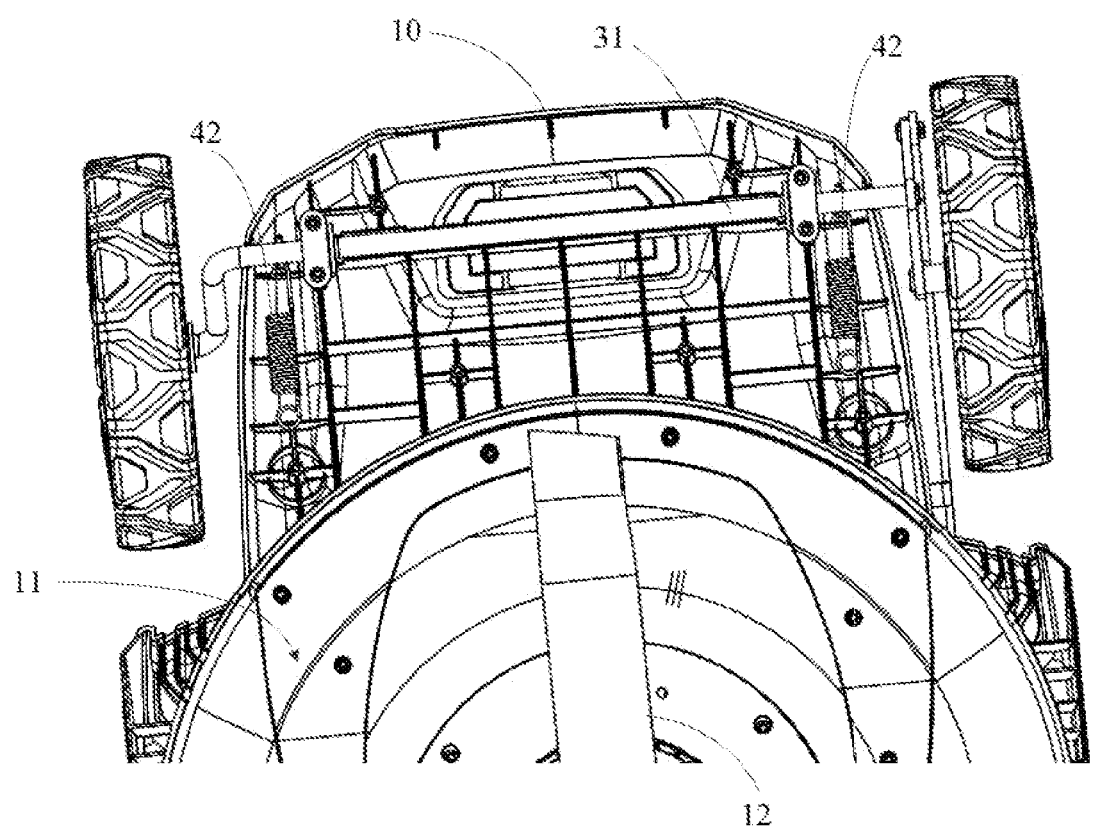
FIG. 3 is a partial view of a bottom of the mower as shown in FIG. 1.

In addition, with reference to FIG. 3, the base 10 at the bottom is provided with a round cavity 11 where a cutting tool 12 is disposed. When the elastic tension of the first elastic member 41 acts on the base 10, an undesired stress may be generated within the base 10. If subjected to the stress for a long time, the bottom of the base 10 may be deformed or even damaged. For example, the front and rear ends of the base 10 curl up, and the left and right sides may be squeezed to the middle. This leads to a failure at precise mating the parts of the base 10, makes disassembling difficult, or deforms the round cavity 11, thus affecting rotation of the cutting tool 12 therein and affecting mounting of the cover plate covering the round cavity 11.

To this end, according to the present disclosure, the mower 1 is further provided with a second elastic member 42. An example of the second elastic member 42 may be a spring located at the bottom of the base 10, which is coupled at the two ends to the front axle 31 and the base 10 and can apply an elastic tension. For distinction, the elastic tension of the first elastic member 41 may be referred to as first elastic tension, and the elastic tension of the second elastic member 42 may be referred to as second elastic tension. Wherein, the stress exerted by the second elastic tension to the bottom of the base 10 is opposite to the stress exerted by the first elastic tension to the bottom of the base 10, to counteract the first elastic tension and prevent stress concentration from being generated. Preferably, the horizontal component of the second elastic tension applied to the bottom of the base 10 is substantially equal to the horizontal component of the first elastic tension applied to the bottom of the base 10. That is, the force exerted by the second elastic member 42 to the base 10 is used to balance the stress in the base 10 generated due to the first elastic tension, so as to slow down or avoid deformation or damage of the base in the long-term use and thus prolong its service life. It would be appreciated that, in a further embodiment, other suitable elastic member may be used as the second elastic member 42.

In the embodiment illustrated in the drawings, the first elastic member 41 is coupled at one end to a part of the base 10 adjacent to the rear axle 32 and coupled at the other end to the middle part of the connecting rod 33. Correspondingly, the second elastic member 42 is disposed at the bottom of the base 10, which is coupled at one end to the front axle 31 and coupled at the other end to the base 10. The second elastic member 42 applies a forward elastic tension to the base 10 to balance the horizontal component exerted by the first elastic member 41 on the bottom of the base 10. Wherein, the second elastic member 42 does not overlap the first elastic member in the longitudinal direction. In other words, the two ends of the second elastic member 42 are disposed on the same side of the first elastic member 41. Alternatively, the second elastic member 42 may partially overlap the first elastic member 41 in the longitudinal direction as long as the stresses generated by them are opposite.

Preferably, there may be two groups of the second elastic members 42 which are disposed adjacent to the two ends of the front axle 31, respectively. In this way, the two ends of the front axle 31 are subjected to substantially balanced tensions to prevent the front axle 31 from titling due to force applied only to one side. It would be appreciated that, in a further embodiment, there may be only one group of the second elastic members 42 which are disposed at a position coupled to the axial middle of the front axle 31, in order to guarantee a force balance of the front axle 31.

Above has been given the description on the technical solution of the present disclosure where the second elastic member 42 is coupled to the base 10 and the front axle 31. It would be appreciated that, depending on the mounting position of the first elastic member 41, the second elastic member 42 may be disposed between the base 10 and the rear axle 32, or may also be disposed between the front end of the base 10 and the front axle 31 as well as between the rear end of the base 10 and the rear axle 32.

The above description on multiple embodiments of the present disclosure is provided to the ordinary skilled in the related field for the purpose of illustration, without any intention to make the present disclosure exclusive or confine the same to a single embodiment disclosed here. As aforementioned, the ordinary skilled in the art would understand that multiple replacements and variations of the present disclosure are also applicable. Therefore, although some alternative embodiments are described here in detail, the ordinary skilled in the art would easily envision or design other embodiments. The present disclosure is intended to cover all the replacements, modifications and variations of the present disclosure, and other embodiments falling into the spirits and scope described here.

We claim:

1. A mower, comprising:
   a base configured to receive a cutting tool; and
   a height adjustment device comprising:
      a front axle supporting a front wheel rotatable about a front wheel rotation axis at each end of the front axle,
      a rear axle supporting a rear wheel rotatable about a rear wheel rotation axis parallel to the front wheel rotation axis at each end of the rear axle, and
      a connecting rod disposed along a longitudinal direction of the mower, a front end of the connecting rod being pivotably coupled to the front axle about a first axis offset relative to the front wheel rotation axis, a rear end of the connecting rod being pivotably coupled to the rear axle about a second axis offset relative to the rear wheel rotation axis;
   wherein the base is supported at a position on the front axle offset relative to the front wheel rotation axis, and a position on the rear axle offset relative to the rear wheel rotation axis,
   wherein, a first elastic member is disposed between the base and the connecting rod, which applies a first elastic tension so that the base has a rising tendency when being in a low position, and
   a second elastic member is disposed between the base and the front axle or between the base and the rear axle, which applies a second elastic tension, a stress exerted by the second elastic tension on a bottom of the base being opposite to a stress exerted by the first elastic tension to the bottom of the base.

2. The mower of claim 1, wherein the second elastic member is disposed on the bottom of the base.

3. The mower of claim 1, wherein second elastic members are arranged at two ends of the front axle and/or two ends of the rear axle.

4. The mower of claim 1, wherein the second elastic member is disposed at an axial middle part of the front axle and/or the rear axle.

5. The mower of claim 1, wherein the second elastic member does not overlap the first elastic member in the longitudinal direction of the mower.

6. The mower of claim 1, wherein the second elastic member partially overlaps the first elastic member in the longitudinal direction of the mower.

7. The mower of claim 1, wherein at least one of the first elastic member and the second elastic member is a spring.

8. The mower of claim 1, wherein a horizontal component of the first elastic tension is balanced by a horizontal component of the second elastic tension.

9. A mower, comprising:
a base configured to receive a cutting tool; and
a height adjustment device comprising:
 a front axle supporting a front wheel rotatable about a front wheel rotation axis at each end of the front axle,
 a rear axle supporting a rear wheel rotatable about a rear wheel rotation axis parallel to the front wheel rotation axis at each end of the rear axle, and
 a front end plate connected to the front axle to offset the front wheel rotation axis and a first axis, or a rear end plate connected to a rear wheel rotation axis and a second axis,
wherein a first elastic member is disposed between the base and a front end plate or between the base and a rear end plate which applies a first elastic tension so that the base has a rising tendency when being in a low position, and
a second elastic member is disposed between the base and the front axle or between the base and the rear axle, which applies a second elastic tension, a stress exerted by the second elastic tension on a bottom of the base being opposite to a stress exerted by the first elastic tension to the bottom of the base.

10. The mower of claim 9, wherein the first elastic member is disposed between the base and a front end plate, or between the base and a rear end plate at a location on the end plate offset from the wheel rotation axis that the end plate intersects.

11. The mower of claim 9, wherein the second elastic member is disposed on the bottom of the base.

12. The mower of claim 9, wherein second elastic members are arranged at two ends of the front axle and/or two ends of the rear axle.

13. The mower of claim 9, wherein the second elastic member is disposed at an axial middle part of the front axle and/or the rear axle.

14. The mower of claim 9, wherein the second elastic member does not overlap the first elastic member in the longitudinal direction of the mower.

15. The mower of claim 9, wherein the second elastic member partially overlaps the first elastic member in the longitudinal direction of the mower.

16. The mower of claim 9, wherein a horizontal component of the first elastic tension is balanced by a horizontal component of the second elastic tension.

17. The mower of claim 9, wherein the height adjustment device comprises both a front end plate connected to the front axle to offset the front wheel rotation axis and a first axis, and a rear end plate connected to the rear axle to offset the rear wheel rotation axis and a second axis.

18. The mower of claim 17, wherein the height adjustment device further comprises a connecting rod disposed along a longitudinal direction of the mower, a front end of the connecting rod being pivotably coupled to a front end plate about a first axis offset relative to the front wheel rotation axis, a rear end of the connecting rod being pivotably coupled to a rear end plate about a second axis offset relative to the rear wheel rotation axis.

19. A method for adjusting the base height of a mower, the method comprising:
allowing variable distance between a base of the mower and a moving device as to allow variable distance between the base of the mower and the surface that the moving device covers;
setting a plurality of user-configurable height settings in which the distance between the base of the mower and the moving device varies;
applying a first elastic tension with a first elastic member, urging a base of a mower away from a moving device, so that the base has a rising tendency when being in a low position; and
applying a second elastic tension with a second elastic member, a stress exerted by the second elastic tension on a bottom of the base being opposite to a stress exerted by the first elastic tension to the bottom of the base so that the net force exerted on the base in the direction of the first elastic member is reduced.

20. The method of claim 19, further comprising locking one setting of the plurality of user-configurable height settings by means of a locking device.

* * * * *